Patented Apr. 20, 1954

2,676,155

UNITED STATES PATENT OFFICE 2,676,155

ASPHALT IN WATER EMULSION

Robert W. Farris, Newark, Ohio, assignor to Owens-Corning Fiberglas Corporation, a corporation of Delaware No Drawing. Application September 27, 1951, Serial No. 248,651

4 Claims. (Cl. 252—311.5)

This invention relates to asphaltic emulsions for use in combination with glass fibers in the manufacture of bonded or impregnated mat and other fibrous structures of the type used for roofing, insulation, asphaltic shingles and the like.

In the past, asphaltic materials have been applied chiefly in the form of a hot melt whereby the solids are reduced to fluid consistency by heating to elevated temperature and maintained at such temperature until arranged in position of use. Application by hot melt has, as a result, been faced with considerable difficulty because melting equipment and equipment for transportation of the molten substance is relatively expensive and cannot always be made available at places where it is desired to effect treatment with asphaltic material. In addition, an asphaltic hot melt is relatively viscous and becomes more viscous upon cooling so that uniform application is difficult to achieve and satisfactory penetration of the fibrous structure or the like for bonding of the fibers one to another or to an underlying surface or base is seldom accomplished. These are but a few of the objectionable features which arise incident to the application of asphaltic materials in the form of a hot melt.

Attempts have been made to incorporate the asphaltic material in media capable of fluid flow so that application will not be dependent upon available heating means or limited by means for transportation. For this purpose, asphaltic substances have been taken into solution with suitable low cost solvents but it has been found difficult to achieve rapid hardening of the asphaltic material because of the slow evaporation rate of the solvent component which is further retarded by the effect of the large concentration of asphaltic material present. Furthermore, the solvent component, generally present in relatively high concentrations, is highly inflammable and relatively expensive.

In view of the difficulties arising out of the use of asphaltic materials in the form of hot melts or solvent solutions, considerable effort has been expended towards the production of asphaltic materials in the form of fine particles dispersed in substantially aqueous media wherein the asphalt material is present in relatively high concentration and in a dispersion which is relatively stable and capable of fluid flow.

Unfortunately the use of asphaltic emulsions in the fabrication with glass fiber structures is faced by further problems in that the glass fibers present surfaces which are not readily wet out by the aqueous emulsion with the result that wetting out and ready penetration of the asphaltic material into the fibrous structure is inhibited. When the ordinary asphaltic emulsions are applied for purposes of impregnation or coating glass fiber structures, the emulsion tends to film over the fabric instead of penetrating therethrough for the purpose of securing uniform impregnation. The asphaltic emulsions appear also to form a foam which renders penetration of the structure still more difficult. These properties peculiar to the treatment of glass fibers with asphaltic emulsions coupled with the properties general to asphaltic emulsions limits the bonding relation that is developed and prevents suitable anchorage of the fibrous structure to underlying coatings or surfaces.

It is an object of this invention to provide an asphaltic emulsion which is not subject to the objectionable feature heretofore described in fabrication with glass fibers and is further capable of rapid set to form a highly flexible, tough, tack-free product which can be handled almost immediately after treatment.

It is another object of this invention to compound an asphaltic emulsion of the type described characterized by low viscosity while maintaining relatively high solids content, good stability, good shelf life and to provide for physical properties which enable rapid and substantially complete penetration of the glass fiber fabric and rapid set of the asphaltic material into a tack-free, flexible structure, and which, when in position of use, is further characterized by high resistance to deterioration, hardening or cracking under all weather conditions to which the structure might be exposed.

It has been found difficult to compound an asphaltic emulsion which is capable of use in the treatment of glass fiber structures for bonding or impregnation purposes. In the effort to embody the described properties in an asphalt emulsion for use in combination with glass fibers, a wide variety of compounds, such as wetting agents, surface tension modifying agents, stabilizers, emulsifying agents and the like have been introduced in various amounts in various combinations and in various types of asphaltic emulsions. Some compounds have been capable of reduction of viscosity, such for example as the metal salts of petroleum sulfonic acids, fatty acid sulfonates or fatty acid amides and the like. However, such compounds, having the ability to reduce viscosity, fail to meet the desired requirements for good penetration, elimination of a thixotropic effect or the ability rapidly to set to form a flexible, tough, tack-free structure having good weathering characteristics. For example, polyoxyethylene derivatives, such as sorbitan monolaurate polyoxyethylene, or sodium salts of sulfonated fatty alcohols, alkyl aryl sodium sulfonates and the like reduce viscosity of an asphaltic emulsion but fail to meet the desired characteristics such as resistance to weathering, high penetration of the glass fiber structure, good film strength, resistance to foaming or the like.

Therefore, it is another object of this invention to produce an asphaltic emulsion for use in the treatment of glass fiber structures in a manner not subject to the limitations described and it is a related object to produce asphaltic bonded or impregnated glass fiber structures having improved characteristics.

In accordance with the practice of this invention, marked reduction in viscosity and rapid penetration of the fibrous glass structure is achieved by the formulation of the asphaltic emulsion with a small amount of an anionic compound in the form of a phosphated alcohol complex and a sulfonated polyester which apparently combine synergistically to give the desired properties to the asphaltic emulsion upon treatment of the glass fiber structure. For example, the desired results are secured by the addition to the asphaltic emulsion of a synergistic combination of sodium pentalauryl polypyrophosphate (phosphated alcohol complex) and sodium diethylhexyl sulfophthalate (sulfonated polyester).

When the synergistic combination of the phosphated alcohol complex and sulfonated polyester is incorporated within the preferred range of 0.01 to 0.45 per cent by weight, the asphaltic emulsion is found to be very stable at low viscosity. It rapidly wets out the glass fiber surfaces to provide for excellent and rapid penetration of the fibrous glass structure and the asphaltic component is capable of being set quickly into a highly flexible, tough, tack-free product having good weathering characteristics.

The additive has been found to be beneficial even when added in such small amounts as 0.005 percent by weight and amounts as high as 2.0 percent by weight may be used to advantage but proportional improvement is not secured by the addition in amounts in excess of 2 percent by weight.

The amount of asphalt which it is desired to have in the emulsion depends very often upon the use which is to be made thereof. For bonded mat, the asphaltic solids usually ranges from 1-20 percent by weight but it is preferred to maintain the solids within concentrations of 10-20 percent by weight. For impregnation of glass wool products, such as in the manufacture of roofing, asphaltic shingles, structural board, pipe wrap and the like, the asphaltic content may be maintained within a range of 30-60 percent by weight. However it is preferred to have the asphaltic solids in amounts ranging from 35-50 percent by weight.

At concentrations higher than 60 percent by weight asphalt, instability of the emulsion often is experienced even in the presence of the phosphated alcohol complex with sulfonated polyester. Thus it is advisable to make use of the additive in emulsions having less than 60 per cent by weight asphalt. It is possible, and for many purposes more desirable, to formulate the asphaltic emulsion in the manner described and with a dispersing agent in the form of finely divided bentonite, china clay, or other finely divided clays present in amounts ranging from 1-10 percent by weight.

Application of asphaltic emulsions compounded in accordance with the concepts described for use in the manufacture of bonded mat of glass fibers or for use in the manufacture of impregnated fibrous structures, such as roofing, may be achieved by way of a flow coating process in which a constant stream of the emulsion is poured over the glass fiber layer after it is formed. In the event that the fibrous layer is self-sufficient, application of the emulsion may be carried out by way of a dip-squeeze process or the like. In any event, it is desirable to provide means for removing excess emulsions, such as by a squeeze process, so that the asphaltic content in the final product will be present in quantities sufficient to cover the fibers and bind the fibers together in the mat. Generally asphalt in amount of about 40 percent by weight is introduced in bonded mat but the amount thereof may vary from 20-60 percent by weight, depending upon the intended use.

After application of the emulsion to the mat of glass fibers, rapid set to conditions for handling is achieved by heat treatment such as at temperatures ranging from 250-850° F. for 2-10 minutes or the like. Such heat treatment may be carried out in an air circulating oven or in a vacuum oven for more rapid removal of the aqueous diluent. When cooled, the asphaltic material sets so that the mat can be handled almost immediately with little difficulty.

It will be understood that when time is available setting may be achieved simply by air drying without the use of any heat treatment.

By way of illustration, an asphaltic emulsion containing 50 percent by weight asphalt and 3 percent by weight clay is capable of being reduced to minimum viscosity upon the addition of 1 percent by weight of the combination of sodium pentalauryl polypyrophosphate and sodium diethylhexyl sulfophthalate in ratios ranging from 25-75 parts of one to 75-25 parts of the other. No thixotropic effect was observed after the emulsion so prepared was allowed to stand for over one hour.

When added dropwise from a height of about 3 inches onto a glass fiber roofing mat, the degree of penetration measured by the blot formed on an underlying absorbent paper after 30 minutes was very good and considerably better than secured by numerous other asphaltic emulsions containing the usual emulsifying, surface modifying or wetting agents. The film formed by the asphaltic emulsion, after being dried over night, was highly flexible, tough and substantially tack-free and the film showed no indications of any pitting or scumming.

The asphaltic composition illustrated has lower viscosity with less of the additive than is capable of being secured by other materials such as polyhydric alcohol esters of high molecular weight mineral organic acids, sorbitan monolaurate, sulfonated mineral oils, or sodium salts of sulfonated fatty acids, even when used in considerably larger concentrations. The penetrability of the asphaltic emulsion through a normal porous mat of glass fibers, such as is used in the manufacture of roofing, is markedly improved over similar asphaltic emulsions embodying other types of modifying agents such as above enumerated. Improvement is also evidenced in the thixotropic effect and the marked reduction thereof secured in accordance with the practice of this invention.

By way of further example, an asphaltic emulsion containing 35 percent by weight asphalt dispersed in aqueous medium and 0.45 percent by weight of the modifying agent composed of sodium pentalauryl polypyrophosphate and sodium diethylhexyl sulfophthalate in about equal amounts is capable of being compounded at a central station for distribution by normal fluid conveying means to a station of use. The asphaltic emulsion, when applied by flow coating process onto a glass fiber fabric, is capable of rapid penetration securely to bond the fibers one to another and to anchor the applied layer onto a base surface prior to setting of the asphaltic component. Thereafter the asphaltic solids may be rapidly set for the production of a tack-free, highly resistant asphaltic treated structure.

In the present practice for the manufacture of roofing, a layer of asphalt in molten condition is mopped over the surface to be covered. One or more glass fiber bonded mats are draped over the asphaltic layer and then one or more layers of asphalt in molten condition are webbed over the surface for the purpose of building up a relatively thick layer of asphalt adapted to be reinforced by the fibrous structure and bonded to the base layer. In the manufacture of roofing in the manner described, it is desirable to have the various layers become integrated into a substantially void-free, composite unit so as to improve its weathering resistance and serviceability. To this end, it is desirable that the asphaltic material applied over the surface of the glass webs have the ability of easily and quickly penetrating the mat, otherwise the voids will not become filled and anchorage between the various layers and the base coat will be incomplete. Such optimum characteristics are not readily available with asphaltic materials applied as a hot melt.

Attempts to substitute aqueous emulsions of the asphaltic material for the hot melt in the manufacture of roofing have, in the past, met with failure because of the natural tendency of the asphaltic emulsion to film over the glass fiber mats instead of penetrating them and the inability of the asphaltic emulsion rapidly to set for drying.

Furthermore, many of the asphaltic emulsions which have been tried foamed so badly that penetration was rendered even more difficult and this lack of penetration and the lack of the ability of the emulsion rapidly to set provided for poor weathering properties of the roofing. When asphaltic emulsions prepared in accordance with this invention, such as the asphaltic emulsions previously described by way of example, are used in the manufacture of roofing, the above mentioned difficulties characteristic of asphaltic hot melts or asphaltic emulsions which have previously been used, appear to be completely overcome. As previously pointed out, penetration of the emulsion through the glass fiber mat is rapid and excellent bond to the underlying surface is achieved. The asphaltic component is capable of rapid set into a uniform, weather resistant, composite layer having good weathering properties.

The stability of the emulsion permits it to be piped over relatively long distances and to be processed through normal handling equipment so as to be more readily available for applications where usage thereof might otherwise be faced with difficulties with respect to labor and equipment.

It will be understood that the term "asphalt," as used herein and in the claims, is intended to include natural asphalt, blown asphalt, petroleum asphalt and the like bitumens.

It will be further understood that numerous changes may be made in the details of composition and use without departing from the spirit of the invention, especially as defined in the following claims.

I claim:

1. A composition for use in the impregnation of a fabric of glass wool fibers to achieve rapid and substantially complete penetration thereof consisting essentially of an asphalt in water emulsion and 0.005-2.0 percent by weight of a synergistic combination of sodium pentalauryl polypyrophosphate and sodium diethylhexyl sulfophthalate.

2. A composition for use in the impregnation of a fabric of glass wool fibers to achieve rapid and substantially complete penetration thereof consisting essentially of an asphalt in water emulsion and 0.01-0.45 percent by weight of a synergistic combination of sodium pentalauryl polypyrophosphate and sodium diethylhexyl sulfophthalate.

3. An asphaltic composition for use in the impregnation of a fabric of glass fibers to achieve rapid and substantially complete penetration thereof consisting essentially of an asphalt in water emulsion containing from 20-50 percent by weight of asphalt in finely divided form and 0.01-0.45 percent by weight of a synergistic combination of sodium pentalauryl polypyrophosphate and sodium diethylhexyl sulfophthalate.

4. An asphaltic composition for use in the impregnation of a glass fiber fabric to achieve rapid and substantially complete penetration thereof consisting essentially of an asphalt in water emulsion containing from 20-50 percent by weight of asphalt in finely divided form, 1-10 percent by weight of a finely divided clay, and 0.005-2.0 percent by weight of a synergistic combination of sodium pentalauryl polypyrophosphate and sodium diethylhexyl sulfophthalate.

References Cited in the file of this patent

UNITED STATES PATENTS

| Number | Name | Date |
|---|---|---|
| 2,137,226 | Bray et al. | Nov. 22, 1938 |
| 2,345,539 | McClellan et al. | Mar. 28, 1944 |
| 2,503,246 | Craig | Apr. 11, 1950 |
| 2,510,033 | Kyrides | May 30, 1950 |

OTHER REFERENCES

Synthetic Detergents, John W. McCrutcheon, Soap & Sanitary Chemicals, August 1949 (only pgs. 39 and 49 relied on).